H. B. GEPHARDT.
HYDROSTATIC SCALE.
APPLICATION FILED OCT. 21, 1914.
1,199,687.
Patented Sept. 26, 1916.
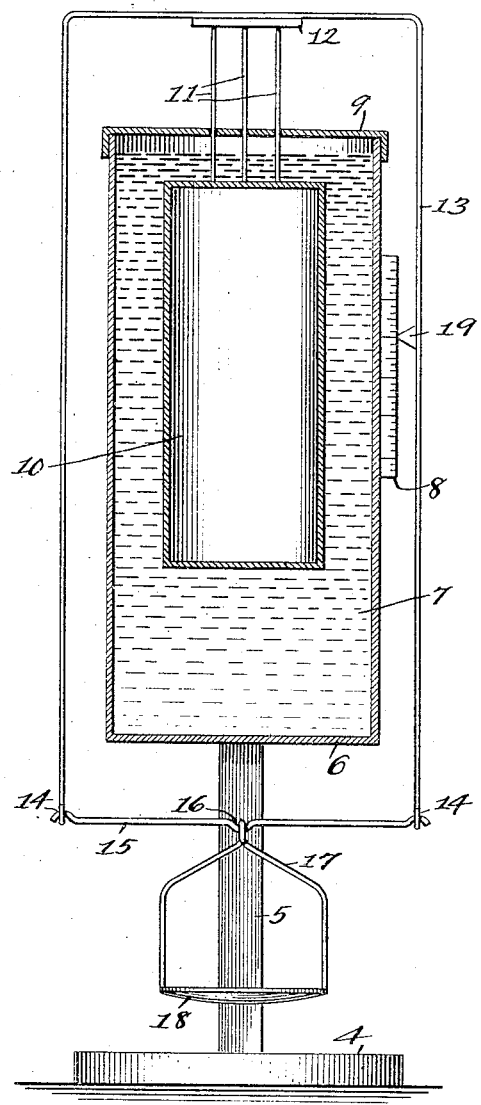
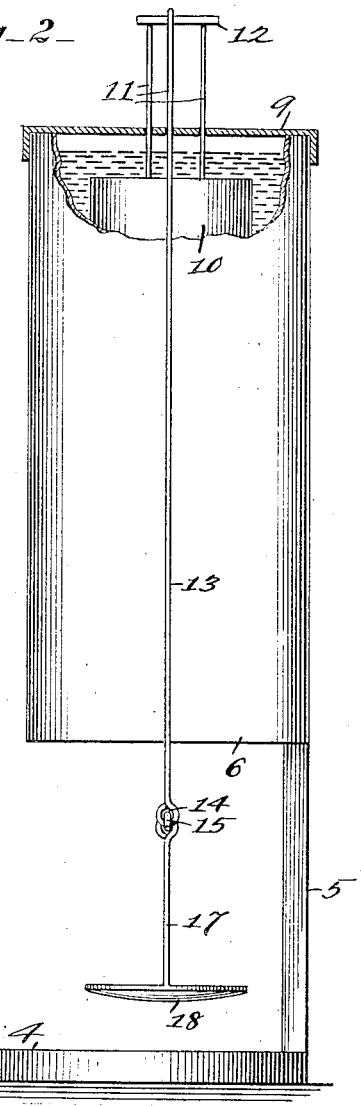
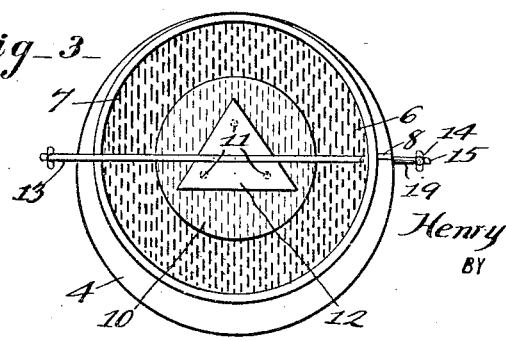
WITNESSES
Frank C. Palmer
J. E. Larsen
INVENTOR
Henry B. Gephardt
BY
Munn Co.
ATTORNEYS

UNITED STATES PATENT OFFICE.

HENRY B. GEPHARDT, OF NEWTON, KANSAS.

HYDROSTATIC SCALE.

1,199,687.  Specification of Letters Patent.  Patented Sept. 26, 1916.

Application filed October 21, 1914. Serial No. 867,753.

*To all whom it may concern:*

Be it known that I, HENRY B. GEPHARDT, a citizen of the United States, and a resident of Newton, in the county of Harvey and State of Kansas, have invented certain new and useful Improvements in Hydrostatic Scales, of which the following is a specification.

My invention relates to weighing scales, and the main object thereof is to provide a simple and inexpensive substitute for the costly sensitive beam balances now employed in physical and chemical laboratories.

A further object is to provide such a device which involves the principle of an hydrometer but wherein the float is entirely submerged beneath the surface of a suitable liquid at all times, thus preventing atmospheric influences thereon, and also preventing the lodging of dust or the like thereon and which might tend to render the scale inaccurate.

A further object is to construct such a device of but few parts not at all likely to get out of order to require repair, and which, in themselves, require no accuracy in manufacture, other than the graduated scale from which the readings are taken.

A further object is to provide such a device wherein the pan is beneath the center of gravity and in the exact line of direction, thus eliminating any possibility of inaccuracy in the event of the object being weighed being placed upon one side of the vertical axis of the device.

A further object is to provide such a device wherein the evaporation of the fluid within which the float is submerged has no effect upon the efficiency or accuracy thereof, nor does a change in temperature affect the same; and still further objects are to provide such devices which may be assembled without special care, which may be shipped without the necessity for careful packing, and which may be stored, after the liquid has been emptied therefrom, in any position.

My invention is fully described in the following specification, of which the accompanying drawings form a part, in which the separate parts are designated by the same reference characters in each of the views, and in which:—

Figure 1 is a central, vertical, section taken through a device of the class described constructed in accordance with my invention; Fig. 2 is a side elevation thereof, partly broken away; and Fig. 3 is a top plan view thereof.

In the drawings forming a part of this application I have illustrated one form of embodiment of my invention, comprising a base 4 having a standard 5 thereon carrying a vertically arranged tank 6 adapted to receive a liquid 7, and said tank has a plate 8 on one side thereof provided with a graduated scale, a cover 9 also being provided for said tank.

Within the tank 6 and entirely submerged in the liquid therein is a float 10, hollow and air-tight, and to the upper end of which are secured a plurality of very thin rods 11, joined at their upper ends by means of a plate 12, and which, in turn, is connected with a yoke-shaped, dependent, frame 13 having eyes 14 at the lower ends thereof; resting in said eyes is a horizontally arranged rod 15 which is looped at its center, as shown at 16, to provide a seat for the bail 17 of a pan 18, and it will be observed that the center of said pan is in the axis of the float and, because of the cover 9, also in the axis of the tank 6.

The weight of the frame 13, pan 18 and connected parts, and rods 11 may be such as to maintain the float beneath the surface of the liquid, or said float may be weighted if desired, and I also provide a pointer 19 on said frame in close proximity to the graduated plate 8 whereby the relative positions of the float and tank may be read.

The operation of the scale depends upon the buoyancy of the float, but said float is not permitted to rise above the surface of the liquid, with the result that no additional displacement of the liquid occurs when a weight is placed upon the pan 18, with the exception of that displaced by the very thin rods 11 for a length equal to the distance which the said float descends.

A known, standard, weight may be placed in the pan and one graduation mark made on the plate 8, and this may be repeated for all the desired weights within the limits of the device, after which the scale is ready for use.

Inasmuch as the float is beneath the surface of the liquid, it is not affected by the lowering of said surface by evaporation, or by changes in temperature, and my scale thus differs radically from any hydrostatic scales known to me, nor can any foreign matter lodge upon the float to render the weighing inaccurate, and an efficient, accurate, simple, and inexpensive scale for determining fine distinctions in weights between different objects, and in determining the exact weight of any object, results.

While I have shown one form of embodiment of the invention, it will be apparent that I do not confine myself to this form, nor to any specific form, as many forms will suggest themselves wherein my principle is employed and, with a reservation to myself of all such changes in and modifications of the form shown as properly come within the scope of the following claims, what I do claim as new, and desire to secure by Letters Patent, is:—

1. A device of the class described, comprising a tank containing a liquid, an airtight float submerged beneath the surface of said liquid, a plurality of rods projected upwardly from said float above said tank, said rods being of a minimum cross sectional area throughout their lengths consistent with a required strength, whereby relatively great float movement is possible with a relatively small displacement of liquid by said rods, and a pan supported by said rods.

2. A device of the class described, comprising a tank containing a liquid, an airtight float submerged beneath the surface of said liquid, a plurality of rods projected upwardly from said float above said tank, said rods being of a minimum cross sectional area throughout their lengths consistent with a required strength, whereby relatively great float movement is possible with a relatively small displacement of liquid by said rods, a yoke-shaped frame dependent from the upper ends of said rods, and a pan depending from said frame.

3. A device of the class described, comprising a tank containing a liquid, an airtight float submerged beneath the surface of said liquid, a plurality of rods projected upwardly from said float above said tank, said rods being of a minimum cross sectional area throughout their lengths consistent with a required strength, whereby relatively great float movement is possible with a relatively small displacement of liquid by said rods, a yoke-shaped frame dependent from the upper ends of said rods and having eyes formed in the lower ends of the arms thereof, a cross rod pivotally supported in said eyes and being centrally looped, and a pan depending from said rod.

In testimony whereof I have signed my name to this specification in the presence of two subscribing witnesses.

HENRY B. GEPHARDT.

Witnesses:
W. J. RICH,
Mrs. W. J. RICH.

Copies of this patent may be obtained for five cents each, by addressing the "Commissioner of Patents, Washington, D. C."